(12) United States Patent
Audy et al.

(10) Patent No.: US 9,444,333 B2
(45) Date of Patent: Sep. 13, 2016

(54) AUTO-TUNING SWITCHING REGULATOR

(71) Applicant: ANALOG DEVICES, INC., Norwood, MA (US)

(72) Inventors: Jonathan M. Audy, Los Gatos, CA (US); Evaldo M. Miranda, Saratoga, CA (US)

(73) Assignee: Analog Devices, Inc., Norwood, MA (US)

( * ) Notice: Subject to any disclaimer, the term of this patent is extended or adjusted under 35 U.S.C. 154(b) by 57 days.

(21) Appl. No.: 14/214,884

(22) Filed: Mar. 15, 2014

(65) Prior Publication Data

US 2014/0285167 A1  Sep. 25, 2014

Related U.S. Application Data

(60) Provisional application No. 61/791,855, filed on Mar. 15, 2013.

(51) Int. Cl.
*H02J 3/12* (2006.01)
*G05F 1/00* (2006.01)
*H02M 3/156* (2006.01)

(52) U.S. Cl.
CPC ..... *H02M 3/156* (2013.01); *H02M 2003/1566* (2013.01)

(58) Field of Classification Search
CPC ............ H02M 2001/0009; H02M 2001/0048; H02M 2001/0054; H02M 2001/0058; H02M 2001/342; H02M 2001/344; H02M 2001/346; H02M 2001/348; H02M 1/083; H02M 1/14; H02M 1/143; H02M 1/146; H02M 1/15; H02M 1/34; H02M 3/135; H02M 3/137; H02M 3/139
USPC ........ 323/241, 246, 266, 274–277, 282–286; 363/39, 56.12, 124
See application file for complete search history.

(56) References Cited

U.S. PATENT DOCUMENTS

| | | | |
|---|---|---|---|
| 2010/0264895 A1* | 10/2010 | Weng .................. | H02M 3/1588 323/285 |
| 2012/0078556 A1* | 3/2012 | Holmberg ............. | H02M 3/156 702/64 |
| 2012/0098553 A1* | 4/2012 | Karlsson ............ | G01R 27/2605 324/684 |

* cited by examiner

*Primary Examiner* — Adolf Berhane
*Assistant Examiner* — Gary Nash
(74) *Attorney, Agent, or Firm* — Schwegman Lundberg & Woessner, P.A

(57) ABSTRACT

In an example, a system and method are disclosed for providing a single control law that is operable to regulate both small-signal, steady-state operation, and large-signal transients of a switching regulator. The control law is based on detecting a zero-crossing of capacitor current, and projecting in advance a turning point for either ramping up or ramping down capacitor voltage at a target voltage. Certain embodiments may realize the control function in high-speed analog components, although certain other embodiments may implement the same or a similar control law in a digital controller.

20 Claims, 5 Drawing Sheets

US 9,444,333 B2

AUTO-TUNING SWITCHING REGULATOR

CROSS-REFERENCE TO RELATED APPLICATIONS

This application claims priority to U.S. Provisional Application 61/791,855, titled "Switching Regulator Trajectory Control Algorithm With Auto-Tuning," filed 15 Mar. 2013, which is incorporated by reference in its entirety.

FIELD OF THE DISCLOSURE

This application relates to the field of electrical power, and more particularly to an automatically-tuning switching voltage regulator.

BACKGROUND

Switching regulators are a type of power supply that exploit the energy storage properties of inductors and capacitors to receive an input voltage and step up, step down, or otherwise regulate an output voltage. In a switching regulator, during a first time span an inductor may have up to the full, unregulated input voltage applied across it. During this first time span, the inductor's current builds up, storing $$\frac{1}{2}LI^2$$

of energy in its magnetic field. During a second time span, energy is transferred from the inductor to a filter capacitor, which smooths the output. When a grounded switch is placed between the inductor and the capacitor, opening and closing the switch alternates between the foregoing first time span and second time span. A control law may be used to compute the optimal switching frequency for the switch to provide a smooth output waveform at the desired voltage.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION OF THE EMBODIMENTS

Overview

Figure 1:
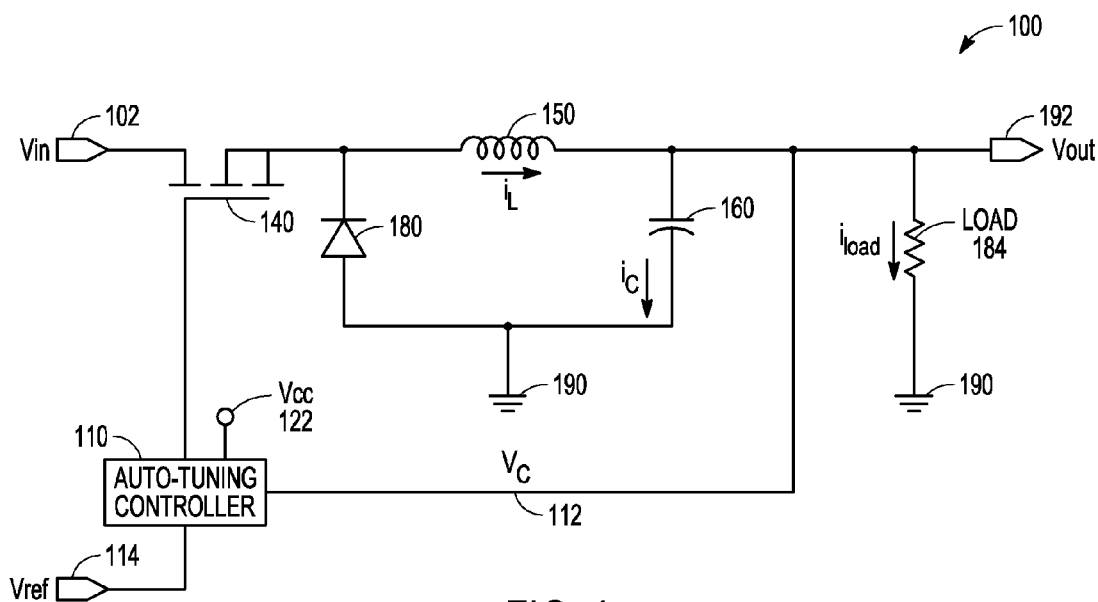
FIG. 1 is an electrical schematic diagram of a switching regulator according to one or more examples of the present specification.

In an example, a system and method are disclosed for providing a single control law that is operable to regulate both small-signal, steady-state operation, and large-signal transients of a switching regulator. The control law is based on detecting a zero-crossing of capacitor current, and projecting in advance a turning point for either ramping up or ramping down capacitor voltage at a target voltage. Certain embodiments may realize the control function in high-speed analog components, although certain other embodiments may implement the same or a similar control law in a digital controller.

In a first embodiment, there is disclosed a switching regulator comprising an inductor with inductance L operable to receive an input voltage; a capacitor with capacitance C electrically coupled to the inductor; a switch electrically disposed to regulate a voltage $v_L$ across the inductor; and a controller operable to control switching of the switch by carrying out a control law for both small-signal current changes and large current transients, comprising: monitoring a current through the capacitor $i_C$; predicting a turning point for switching the switch based on the current through the capacitor; switching the switch at the turning point; and automatically tuning the switching regulator to a coefficient of the switching regulator to match a coefficient of the control law.

In a second embodiment, there is disclosed an auto-tuning controller for regulating a switching regulator, comprising circuitry operable to control switching of a switch by carrying out a control law for both small-signal current changes and large current transients, comprising: monitoring a current through a capacitor $i_C$; predicting a turning point for switching a switch based on the current through the capacitor; switching the switch at the turning point; and automatically tuning itself to a coefficient of the control law.

In a third embodiment, there is disclosed A method for regulating a switching regulator including an inductor with inductance L and capacitance C, comprising operating a switching circuit by implementing a single control law for both small-signal current changes and large current transients, comprising: monitoring a current through a capacitor $i_C$; predicting a turning point for switching a switch based on the current through the capacitor; switching the switch at the turning point; and continuously tuning the switching circuit, including during non-transient conditions, to the ratio L/C.

Example Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed.

Different embodiment many have different advantages, and no particular advantage is necessarily required of any embodiment.

In a switching regulator, because the inductor and capacitor both provide mathematical integrals, the control law is a two-pole function. Thus, a traditional compensator may require a double-pole, double-zero compensation network. Such a network may be unacceptably costly or complicated, for example in an application where a circuit is to be realized in silicon or some other semiconductor in an integrated circuit, where silicon space is at a premium, and where analog components take up a relatively large amount of space. Thus, it is advantageous in some embodiments to have a compensation network that instead relies on a mathematical computation, and that may use fewer components.

FIG. 1 is an electrical block diagram of a switching regulator 100, according to one or more examples of the present specification. Switching regulator 100 receives an input voltage $V_{in}$ 102, and provides an output voltage $V_{out}$ 192. In an example, $V_{in}$ 102 may be a substantially steady-state DC input voltage, while $V_{out}$ is ideally a perfect DC output voltage that may be either stepped up or stepped down from $V_{in}$ ($V_{out}=kV_{in}$, where k is a step-up or step-down factor). FIG. 1 specifically shows, by way of non-limiting example, a "buck"-style converter, wherein $V_{out}$ is stepped down from $V_{in}$, while the output current is stepped up.

An inductor 150 receives across it a potential difference, which in an example may be up to the full $V_{in}$, and more specifically may be $V_L=V_{in}-V_{out}$. Inductor 150 is provided by way of non-limiting example only, and it is not intended herein that inductor 150 be restricted to a particular value. Furthermore, inductor 150 can be readily replaced with any inductor, transformer, winding, electrical machine, or other device operable to provide a useful inductance L. Similarly, capacitor 160 is provided by way of non-limiting example, and it is not intended herein that capacitor 160 be restricted to a particular value. Capacitor 160 can also be readily replaced with any capacitor, buffer, or storage cell operable to provide a useful capacitance C.

A diode 180 is disposed between inductor 150 and ground 190. In this example, a capacitor 160 is also referenced to ground 190, which may be any suitable reference or $V^-$ node. Throughout these figures, certain voltage reference terms are used by way of example only, and should be understood in that context. For example, certain example circuits may include a positive node $V^+$ and a negative node $V^-$. Nodes $V^+$ and $V^-$ both have many possible values. By convention, $V^+$ is spoken of as being the most "positive" voltage and $V^-$ is spoken of as being the most "negative" voltage. Thus, under appropriate circumstances, either $V^+$ or $V^-$ could be considered a "supply" or "positive" voltage, and under other circumstances, either $V^+$ or $V^-$ could be considered a "ground," "negative," or "negative supply" voltage. It should be noted that $V^-$ need be neither an absolute ground ("earth" or "chassis"), nor necessarily negative with respect to earth or chassis ground. Furthermore, "positive" and "negative" may be understood to refer simply to two opposite sides of a difference in potential. Thus, where a signal has a "positive side" and a "negative side," this may be construed generally to mean that the positive side of the signal includes those portions above a reference voltage, while the negative side of the signal includes those portions below the reference voltage. In some embodiments, a zero point is defined at earth ground or chassis ground and $V^+$ and $V^-$ may have values of substantially the same magnitude but opposite sign.

A transconductor 140, such as a MOSFET, acts as a switch. As used throughout this specification, a "transconductor" includes any non-passive device with three or more nodes configured to provide a transconductance or transconductance effect. Transconductors include any solid-state transistors, including bipolar junction transistors (BJT), field-effect transistors (FETs), metal-oxide FETs (MOSFETs), junction FETs (JFETs), triodes, vacuum tubes, current-to-voltage converters, voltage-to-current converters, and amplifiers by way of non-limiting example. For ease of reference, all such devices are referred to herein generically as transconductors. In general, a transconductor will have at least three nodes, which can be referred to as a first node (base, gate, or similar), second node (source, emitter, or similar), and third node (drain, collector, or similar). In many disclosed examples, one type of transistor, such as a "p-type" transistor, may be trivially substituted for another transistor, such as an "n-type" transistor by rearranging polarities in a circuit design. Thus, unless expressly stated otherwise, it is intended herein that, for example, a design employing an n-type MOSFET be considered the equivalent of a similar design employing a pnp-type BJT with appropriate modifications. Furthermore, transconductor 140 is disclosed as only one example of a switch. As used throughout this specification, a "switch" includes any device configured to selectively either permit or impede current to flow, and may include in appropriate circumstances a transistor or other transconductor, mechanical relay, electromechanical switch, microelectromechanical switch, or mechanical switch, by way of non-limiting example.

Transconductor 140 has a gate node controlled by Trajectory and auto-tuning controller 110. Trajectory and auto-tuning controller may provide a high-frequency on-and-off switching pattern at the gate of transconductor 140. In some examples, trajectory and auto-tuning controller 110 may receive a supply voltage $V^+$ or $V_{CC}$. Trajectory and Auto-tuning controller 110 is placed in a feedback configuration with $V_{out}$ 192 and is disposed to measure $V_{out}$ 192 and to provide an appropriate switching frequency to drive a desired output on $V_{out}$ 192.

$V_{out}$ 192 may be provided to a load 184, referenced to ground 190. A current $i_{load}$ flows through load 184, while a capacitor current $i_C$ flows through capacitor 160 and a current $i_L$ flows through inductor 150. Because switching regulator 100 is a buck-style converter, switching regulator 100 converts from a higher input voltage to a lower output voltage, with a correspondingly higher output current, maintaining input and output power substantially the same.

Trajectory and auto-tuning controller 110 may also receive an input reference voltage $V_{ref}$ 114, and is operable to provide a control signal to regulate oscillator transconductor 140 and provide a switching frequency of transconductor 140. Reference voltage $V_{ref}$ 114 may be considered a theoretically-perfect DC voltage level providing the nominal value of $V_{out}$ 192. $V_{ref}$ 114 may be provided for example by a voltage reference such as one or more diodes, Zener diodes, bandgap references, or other suitable device. In one or more examples of the present specification, trajectory and auto-tuning controller 110 may be configured to realize a control law, such as the control law of Equation 1 below. It should be noted, however, that Equation 1 is disclosed by way of example only, and that numerous other control laws are capable of being realized in auto-tuning controller 110. It is therefore the intent of this specification to treat trajectory and auto-tuning controller 110 as being capable of realizing any suitable control law for switching regulator 100.

In steady-state operation, transconductor 140 alternates between on and off states in a repeating periodic manner, such that the inductor current forms a repeating triangle wave whose average value is equal to the load current. The peaks and troughs of the inductor current are filtered out by capacitor 160 which charges and discharges with the rippling portion of this current. The detailed sequences are as follows:

In a first time period, transconductor 140 is switched to its on state. During this period the inductor current $i_L$ ramps in proportion to the applied positive voltage across the inductor. In a second time period, transconductor 140 is switched to its off state. During this state, the positive current in the inductor naturally creates a negative voltage at the unconnected end, until diode 180 is forward biased and the current can continue to conduct. At this point the voltage across the inductor is $V_L=-(V_t+Vdiode)$. The inductor current $i_L$ then ramps down while continuing to deliver current to the combined output capacitor 160 and load 184. Output capacitor 160 is now either charging or discharging, depending on whether the load current is greater or lesser than the inductor current. Thus, by switching transconductor 140 at a high enough frequency, a usable $V_{out}$ is provided by capacitor 160. Given a sufficiently large C, capacitor 160 maintains a substantially constant voltage across its terminals during each switching cycle. Additionally, $i_C$, the current flowing through capacitor 160, may oscillate around zero and have an average value of zero over time. In an example embodiment, trajectory and auto-tuning controller 110 provides high-switching frequency according to a control law of the form:

$$\Delta v_C = \frac{i_C^2}{2v_L} \cdot \frac{L}{C}$$

Switching occurs when the left side of the equation becomes equal to the right side of the equation. The error voltage $\Delta v_C$ for peak and valley thresholds may include different selected target voltages.

Equation 1

Auto-Tuning Controller Control Law

Figure 2:
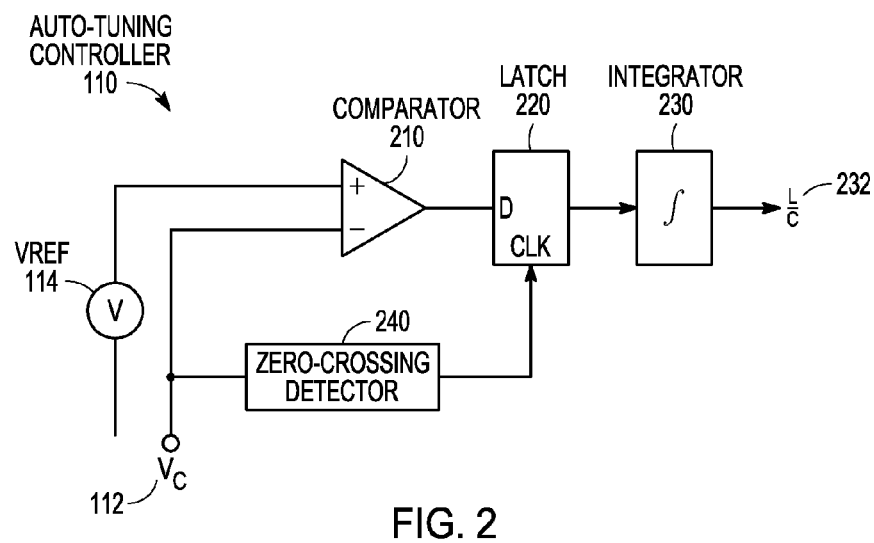
FIG. 2 is a block diagram of an auto-tuning controller according to one or more examples of the present specification.

FIG. 2 is a block diagram of auto-tuning controller 110 according to one or more examples of the present specification. In an example, auto-tuning controller 110 forms a portion of trajectory and auto-tuning controller 120, and in particular measures the trajectory control error on one threshold voltage, which could be peak or valley. In another embodiment, auto-tuning controller 110 may measure both peak and valley threshold voltage errors and use the sum of these two errors, the "ripple voltage overshoot/undershoot error." Advantageously, this may also eliminate system offset errors. In the following discussion, FIG. 2 will be discussed jointly with FIGS. 2A, 3 and 6, although it should be recognized that this is not intended to imply any of the examples of FIGS. 2, 2A, 3 and 6 require one another in every case.

In an example, trajectory and auto-tuning controller 110 may be configured to provide control functions for switching regulator 100. In one embodiment, trajectory and auto-tuning controller 110 is configured to realize the control law of Equation 1. Auto-tuning controller 110 may include a zero-crossing detector 240, an embodiment of which is disclosed in more detail with reference to FIG. 2A.

Figure 2A:
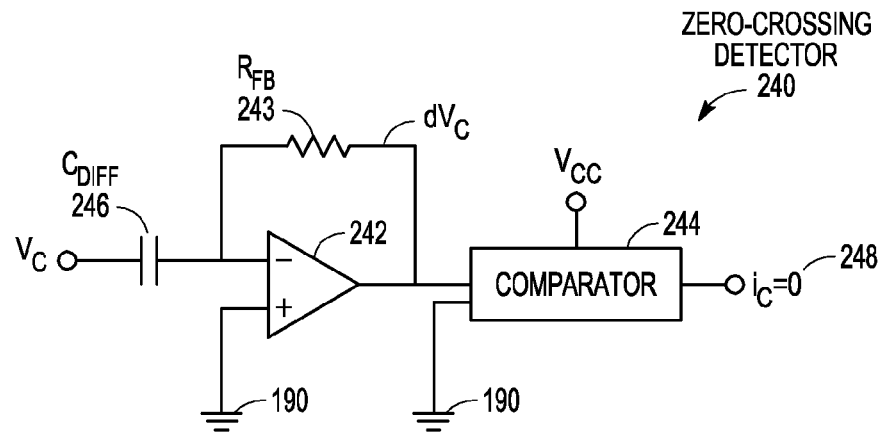
FIG. 2A is a block diagram of an embodiment of a zero-crossing detector according to one or more examples of the present specification.

FIG. 2A is a block diagram of an embodiment of zero-crossing detector 240 according to one or more examples of the present specification. The function of zero-crossing detector 240 is to determine when the current $i_C$ through capacitor 160 changes sign when crossing through zero value. Capacitor current is difficult to measure directly, especially when output capacitance can be distributed over a circuit board or integrated circuit. If the output capacitor is a single device, a small series resistor with the capacitor would provide a direct measurement of the capacitor current, but this resistor is often undesirable. However, the non-zero magnitude of current $i_C$ is irrelevant to auto-tuning controller 110 of FIG. 2. Thus, the derivative of $v_C$, the voltage across capacitor 160, can be used to detect the $i_C$ zero crossing.

Zero-crossing detector 240 receives $v_C$ as an input, which passes through a differentiating capacitor 246 to opamp 242. Opamp 242 has a feedback resistor $R_{FB}$ 243 connected to its inverting input. The non-inverting input is tied to ground 190. Opamp 242 outputs the derivative of $v_C$ ($dv_C$) to a comparator 244. Comparator 244 is powered by a supply voltage $v_{CC}$ 122, and has two inputs. One input is $dv_C$ and the other is tied to a zero reference. Thus, output node 248 is high if and only if $dv_C>=0$, which occurs only after $i_C$ crosses zero.

In an example of the present specification, trajectory and auto-tuning controller 110 is configured to realize a control law of the form of Equation 1.

Figure 3:
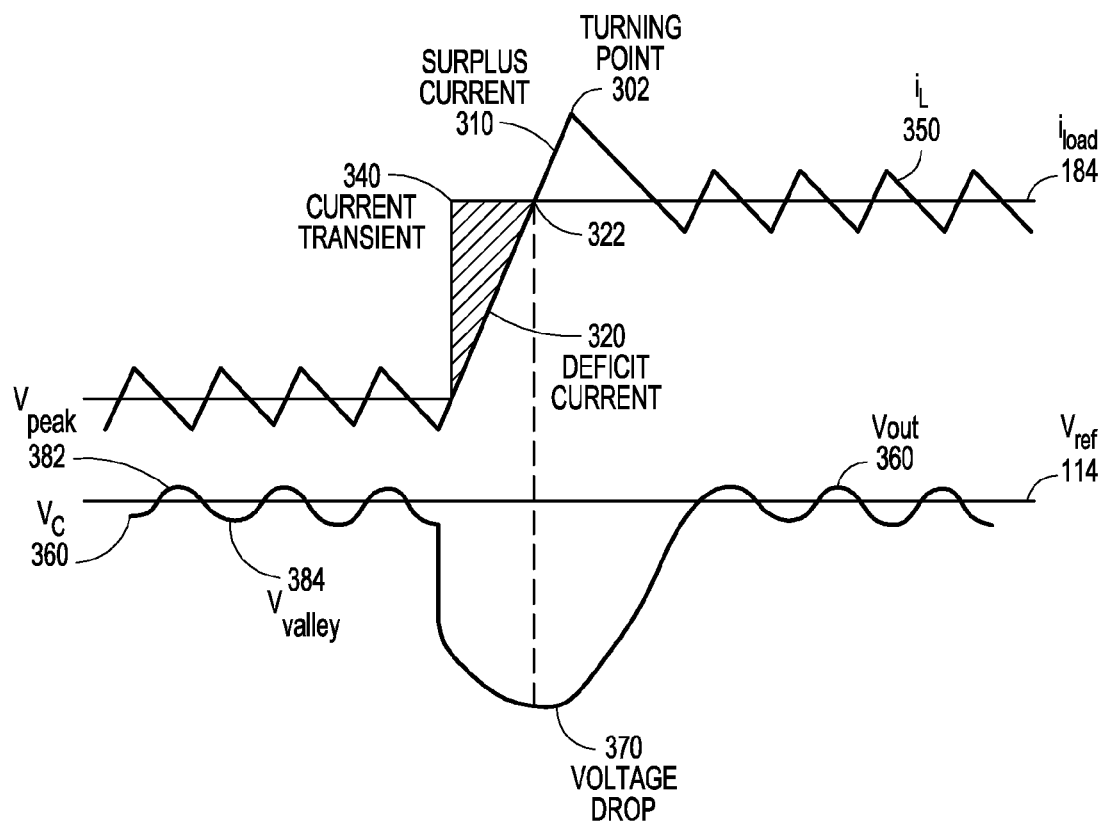
FIG. 3 is an output waveform for a switching regulator according to one or more examples of the present specification.

A valuable property of "trajectory control" is that the control equation for the steady-state small signal model is the same as that for large signal transient response. This is best recognized with reference to FIG. 3. FIG. 3 discloses output waveforms for switching regulator 100 according to one or more examples of the present specification. The example waveforms include $i_L$, representing the current through inductor 150, and $v_C$, representing the voltage across capacitor 160. A nominal or "ideal" load current $i_{load}$ 184 is shown as a perfect square wave, including a current transient 340. The output tracks an ideal voltage reference, $V_{ref}$ 114. Because switching regulator 100 is not an ideal voltage source, the actual output waveforms are represented by $i_L$ 350 and $v_C$ 160. In steady-state operation, $i_L$ 350 is a sawtooth waveform. Specifically, $i_L$ ramps up until the control equation conditions for ramp-up termination are met, at which point transconductor 140 switches. Ramp-down then starts and $i_{out}$ 350 crosses $i_{load}$ 185 again, and terminates when the control equation conditions are met for ramp-down. Thus, $i_L$ 350 oscillates as a sawtooth waveform around $i_{load}$ 185. It should be noted, however, that the ramp up of $i_L$ 350 does not necessarily have the same slew rate as the ramp down of $i_L$ 350.

When switching regulator 100 encounters current transient 340, $i_L$ 350 experiences current deficit 320. $i_L$ is thus ramped up past the new value of $i_{load}$ 185 to provide a compensating surplus current 310. At a numerically calculated turning point 302, calculated by the control law of trajectory controller 600, the sawtooth waveform resumes at the new average value of $i_{load}$ 185.

Figure 6:
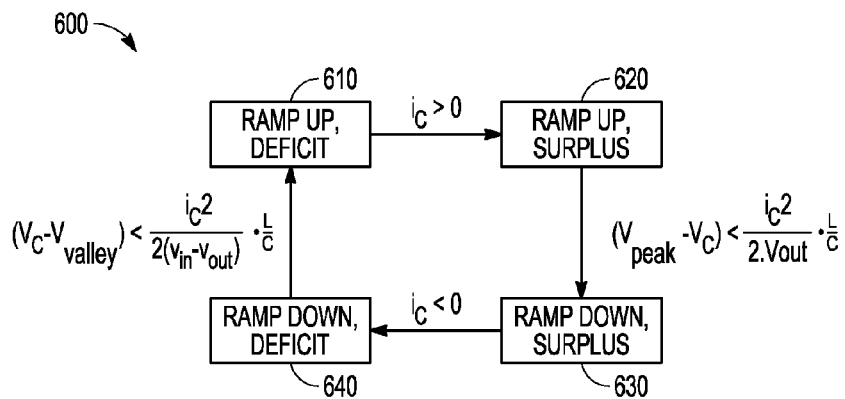
FIG. 6 is a state machine implementation of the auto-tuning trajectory control method according to one or more examples of the present specification.

The switching frequency depends on the chosen magnitude of the ripple voltage window (peak and valley $v_{ref}$ values as shown FIG. 6). In certain known applications, separate equations are required for calculating the values of $v_{ref}$ 114 required to provide a chosen switching frequency of steady-state $i_L$ 350.

In the case of an ideal output voltage supply, $v_C$ is identical to nominal voltage $v_{ref}$ 114, providing an absolutely steady-state output voltage responsive to current transient 340. In practice, the actual response of one or more embodiments of the present specification is shown by $v_C$ 160. Under normal operating conditions, $v_C$ 160 is similar to a sine wave with a period that corresponds to the period of sawtooth waveform $i_L$ 350. However, upon experiencing current transient 340, switching regulator 100 may require some time to ramp up $i_L$, and capacitor 160 must supply an excess current to load 184 during this time. Thus, $v_C$ 160 will experience a corresponding voltage drop 370. At zero crossing 322, $v_C$ 160 begins to ramp back up toward $v_{ref}$ 114, converting surplus inductor current 310 back to capacitor voltage, and then resuming steady-state sinusoidal-like operation.

A properly constructed trajectory and auto-tuning controller 110 according to one or more examples of the present specification will realize $i_{out}$ 350 and $v_C$ 160 according to the disclosure of FIG. 3. In the example of FIG. 2, a comparator 210 receives a reference voltage $v_{ref}$ 114 and $v_C$ 112. Comparator 210 compares $v_{ref}$ 114 to $v_C$ 112 and provides its output to data latch 220. Latch 220 is clocked by a zero crossing detector 240 that is configured to detect when $i_C$, the current through capacitor 160, is zero. Whenever this occurs, latch 220 is clocked, and the result of comparator 210 is output by latch 220, representing for example whether $v_C$ is greater or less than $V_{ref}$. An integrator 230 receives the data output of latch 220 and provides an output signal 232, which mathematically represents a voltage proportional to L/C or the ratio of inductance to capacitance.

As is evident in Equation 1, control of switching regulator 100 relies on the values of L and C. But because these two terms are provided in the form of a ratio, their exact individual values do not need to be calculated separately. Rather, only the ratio L/C is needed. The other values needed by Equation 1 may be measured directly in the circuit as a voltage or a current. Thus, according to one or more examples of the present specification, the derivation of a single adjustable term L/C may be used to autotune the circuit.

Compensation of a switching regulator is typically done using small-signal pole-zero analysis in the frequency domain. However, in some cases, this control law does not work well for large-signal behavior. During large load transients the feedback path through auto-tuning controller 110 goes 'open loop' and the current through inductor 150, $i_L$, is essentially slewed to whatever it takes to bring the $v_C$ 112 back into regulation. By the time capacitor 160 is back in regulation, $i_L$ may be off target, resulting in either overshoot or undershoot depending on the sign of the load current change. A typical solution is to add damping to the control loop, which introduces additional complexity and nonlinearities, and slows down the response speed.

An alternative approach disclosed herein is called "trajectory control." Much like computing the firing of a projectile to a target, trajectory and auto-tuning controller 110 may compute in advance the amount of energy required to bring $v_C$ back to a target value. A separate compensation circuit may thus be unnecessary in certain embodiments.

In some cases, a trajectory control equation according to this specification can be somewhat complex. Ideally, the $i_L$ term should be perfectly timed to start ramp-down (or up) with a final goal being that at the exact moment when $i_L = i_{load}$ (and thus, $i_C = 0$), the output voltage $v_{out}$ 192 is correct. The goal of trajectory control is to calculate the correct turning point 302 after passing from deficit current 320 through to the surplus current 310, and then switch precisely at turning point 302.

Certain older switching regulator control methods monitor the output voltage $v_{out}$ 192 and the inductor current $i_L$, but not the load current $i_{load}$ or capacitor current $i_C$. As noted above, $i_C$ may be difficult to measure directly, but without $i_C$, or at least without detecting $i_C = 0$, a complete computation of control may not be possible. Thus, in order to control capacitor voltage $v_C$, one or more examples of the present specification monitor $i_C$, as well as the error (or deviation) of the capacitor $\Delta v_C$. Inductor current $i_L$ and load current $i_{load}$ are thus not per se relevant to the control law, and thus need not be measured directly.

To initially develop an equation to solve for $\Delta v_C$, some simplifying assumptions were made for the purpose of modeling first-order effects. Namely:
 a. Capacitor 160 has zero equivalent series resistance (ESR);
 b. $i_{load}$ is DC, except where step load changes, such as current transient 340, occur; and
 c. Changes to $v_{out}$ 192 are very small compared to $v_{in}$ 102 ($\Delta v_{out} \ll \Delta v_{in}$).

In other words, to adjust the L/C term, auto-tuning controller 110 samples the value of $v_C$ at the exact time when $i_C = 0$. At this point, if the circuit is tuned correctly, then the error in $v_C$ is also zero ($\Delta v_C = 0$). Integrator 230, whose output represents the value of L/C can thus have its input driven by the magnitude and/or sign of $\Delta v_C$ when $i_C = 0$. Latch 220 may be used as a sample and hold circuit to capture the error at this point in time, and to drive the output of integrator 242.

Comparator 220 may be used to capture only the sign of $\Delta v_C$ by comparing $v_C$ 112 to $v_{ref}$ and driving integrator 230 with a positive or negative drive voltage. When auto-tuning controller 110 has reached optimal tuning, the output of comparator 210 should alternatively toggle back and forth, iterating around $v_{ref}$ 114 at the output of integrator 230.

When a load transient occurs, such as current transient 340, inductor 150 must ramp to the new $i_{nom}$. During this ramping period, there is an energy deficit 320, represented by the area of the filled-in triangle, and capacitor 160 is discharging. Thus, $i_C$ must be ramped past the new value of $i_{nom}$ to provide a surplus of current to replenish the lost charge during current deficit 320. After some surplus time, there is a perfect turning point 302 where the $i_C$ can be ramped back to equal the load current such that $dv_C = 0$ when $i_C = 0$.

A noticeable side effect of the foregoing method is that any ESR effect will drop out of the equation when $i_C = 0$. It should also be noted that while Equation 1 is configured to regulate a peak $v_C$, the equation can be solved for other values, such as regulating a trough $v_C$.

Figure 4:
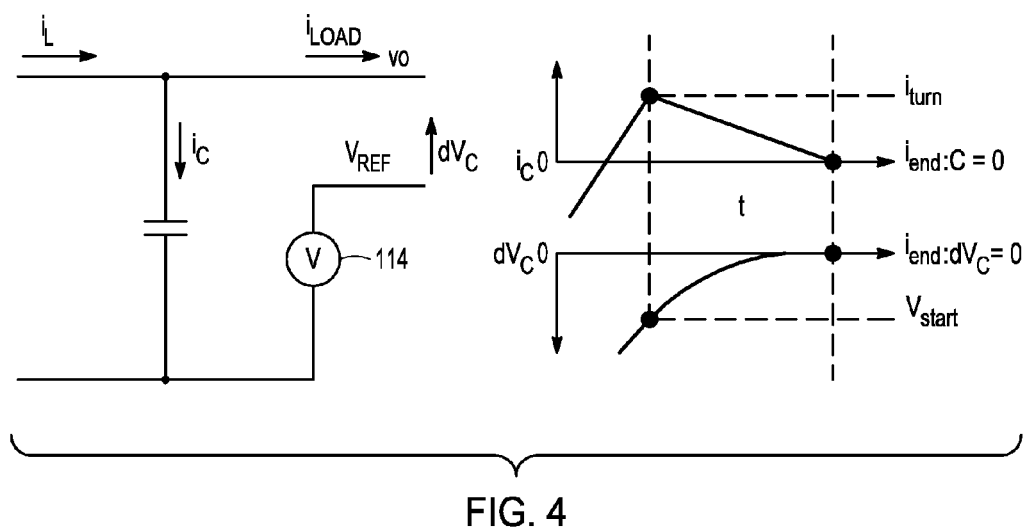
FIG. 4 is an illustration of small-signal analysis according to one or more examples of the present specification.

Working backwards, it is assumed that when $i_C = 0$, $\Delta v_C = 0$ as well (which is the case when the circuit is properly tuned, as noted above), then auto-tuning controller 110 can calculate what $v_C$ was at any previous time for any given current during the ramp down. For a fixed load current $i_{load}$, the ramp down rate of $i_C$ equals the ramp down rate of $i_L$, though with a different DC offset. This relationship is illustrated by FIG. 4, which is an illustration of small-signal analysis according to one or more examples of the present specification.

Because L/C can be considered a constant, Equation 1 is primarily dependent on measuring $i_C$ and $v_L$. Because this is a square-law equation, it can advantageously be realized using the square-law of a MOSFET. Furthermore, because Equation 1 has a lumped-coefficient of L/C for tuning, it lends itself well to auto-tuning as described within this specification.

Derivation of the example control law disclosed in Equation 1 will now be discussed in more detail.

The capacitor charge equation is given by:

$$Cv = it$$

Equation 2

Capacitor Charge Equation

When trajectory and auto-tuning controller 110 begins ramping down $i_L$, the difference between $i_L$ and $i_{load}$ is $i_C$ ($i_L - i_{load} = i_C$), and $i_C$ may be ramped to zero so that $i_L = i_{load}$.

Furthermore, the current $i_C$ during the ramp to zero will have an average value of $$\frac{i_C}{2}.$$

Thus, $$c \cdot \Delta vC = i_C \cdot \frac{t}{2} \qquad \text{Equation 3}$$

The time taken to ramp the inductor current down by this amount is:

$$t = i_C \cdot \frac{L}{v_L} \qquad \text{Equation 4}$$

This may be substituted for t in the previous equation:

$$c \cdot \Delta vC = i_C \cdot \frac{i_C \cdot L}{2v_L} \qquad \text{Equation 5}$$

Solving for $dv_C$ yields Equation 1:

$$\Delta vC = \frac{iC^2}{2v_L} \cdot \frac{L}{C}$$

As soon as:

$$\Delta vC < \frac{i_C^2 L}{2v_L C}, \qquad \text{Equation 6}$$

ramp down of $i_L$ should begin. When $i_C$ reaches zero, $dvC=0$. This provides optimal transient recovery with no overshoot or undershoot. Note that Equation 1 may easily be modified for both up and down transients by modifying the $v_L$ term.

In certain embodiments, known modulation methods may be applied to trajectory control methods disclosed in this specification, such as hysteretic ripple voltage, pseudo-fixed frequency, and true fixed frequency. Of those, in certain embodiments, true fixed-frequency may be the most limiting in transient performance.

Figure 5:
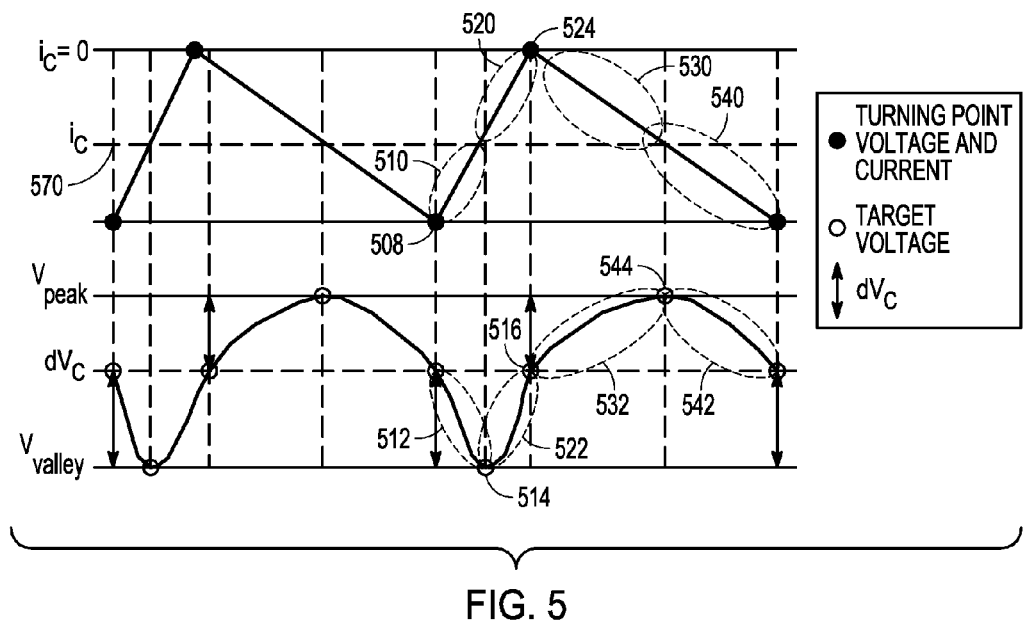
FIG. 5 is an enlarged graph of $i_C$ versus $dv_C$ according to one or more examples of the present specification.

FIGS. 5 and 6 are diagrams representing hysteretic ripple voltage regulation according to one or more examples of the present specification. To realize the control law of Equation 1, an upper peak voltage target $v_{peak}$ 382 may be selected for the peak-current turning point under steady-state operating conditions, and a lower target voltage $v_{valley}$ 384 may be set for the valley-current turning point. The same turning point equation may be used with a different $v_L$ and different target voltage. This relationship is illustrated by FIG. 5, which is an enlarged graph of $i_C$ versus $dv_C$ according to one or more examples of the present specification. Certain designated regions of FIG. 5 are best understood in connection with the discussion of FIG. 6, and so the two FIGURES are described jointly in the following discussion.

FIG. 6 is a state machine implementation of the auto-tuning trajectory control method according to one or more examples of the present specification.

The state machine 600 of FIG. 6 includes four active states, namely "Ramp up, deficit" in block 610, "Ramp up, surplus" in block 620, "Ramp down, surplus" in block 620, and "Ramp down, deficit" in block 640. Blocks 610, 620, 630, and 640 correspond to regions 510 and 512, 520 and 522, 530 and 532, and 540 and 542 of FIG. 5 respectively.

State 610 represents a state wherein there is a deficit of current $i_L$ (region 510 of FIG. 5) and deficit of voltage $v_C$ (region 512). State machine 600 enters this state when $\Delta v_C = 0$, which will correspond to $i_C$ reaching a negative turning point 508 if auto-tuning controller 110 is properly tuned. During this state, as seen in region 510, current is flowing out of capacitor 150 ($i_C < 0$), and $i_C$ is ramping up (or in other words, trending in a more-positive direction). In region 512, $dv_C = 0$ when state machine 600 enters state 610, and trends downward (or in other words, in a more-negative direction), meaning that there is a deficit of voltage across capacitor 150, and the deficit deepens as $v_C$ is converted to current to ramp up $i_C$.

State 620 represents a state wherein there is a surplus of $i_C$ (region 520 of FIG. 5) and deficit of $v_C$ (region 522). State machine 600 enters this state when $i_C$ 570=0, which will correspond to negative target voltage 514 of $dv_C$ if autotuning controller 110 is properly tuned. During this state, as seen in region 520, current is flowing into capacitor 150 ($i_C > 0$), and $i_C$ is ramping up (or in other words, trending in a more-positive direction). In region 522, $dv_C$ is at negative target voltage 514 when state machine 600 enters state 620, and trends upward (or in other words, in a more-positive direction), meaning that there is a deficit of voltage across capacitor 150, but the deficit recovers as inductor current flowing into capacitor 150 is converted to voltage.

State 630 represents a state wherein there is a surplus of $i_C$ (region 530 of FIG. 5) and a surplus of $v_C$ (region 532). State machine 600 enters state 630 when $$v_{peak} - v_C < \frac{i_C^2}{2v_{out}} \cdot \frac{L}{C},$$

which occurs at inflection point 516 where $dv_C=0$, and will correspond to turning point 524 if auto-tuning controller 110 is properly tuned. During this state, as seen in region 530, current is flowing into capacitor 150 ($i_C>0$), and $i_C$ is ramping down (or in other words, trending in a more-negative direction). In region 532, $dv_C$ is positive at inflection point 516 when state machine 600 enters this state, and trends upward (or in other words, in a more-positive direction), meaning that there is a surplus of $i_C$, which begins to be converted to $v_C$.

State 640 represents a state wherein there is a deficit of $i_C$ (region 540 of FIG. 5) and a surplus of $v_C$ (region 542). State machine 600 enters state 640 when $i_C=0$, which will correspond to positive target voltage 544 of $dv_C$ if auto-tuning controller 110 is properly tuned. During this state, as seen in region 520, current is flowing out of capacitor 150 ($i_C<0$), and $i_C$ is ramping down (or in other words, trending in a more-negative direction). In region 542, $dv_C$ is at positive target voltage 544 when state machine 600 enters state 640, and trends downward (or in other words, in a more-negative direction), meaning that there is a surplus of $i_C$, which is converted to $v_C$, which is stored as energy for when state machine 600 again enters state 610.

Figure 7:
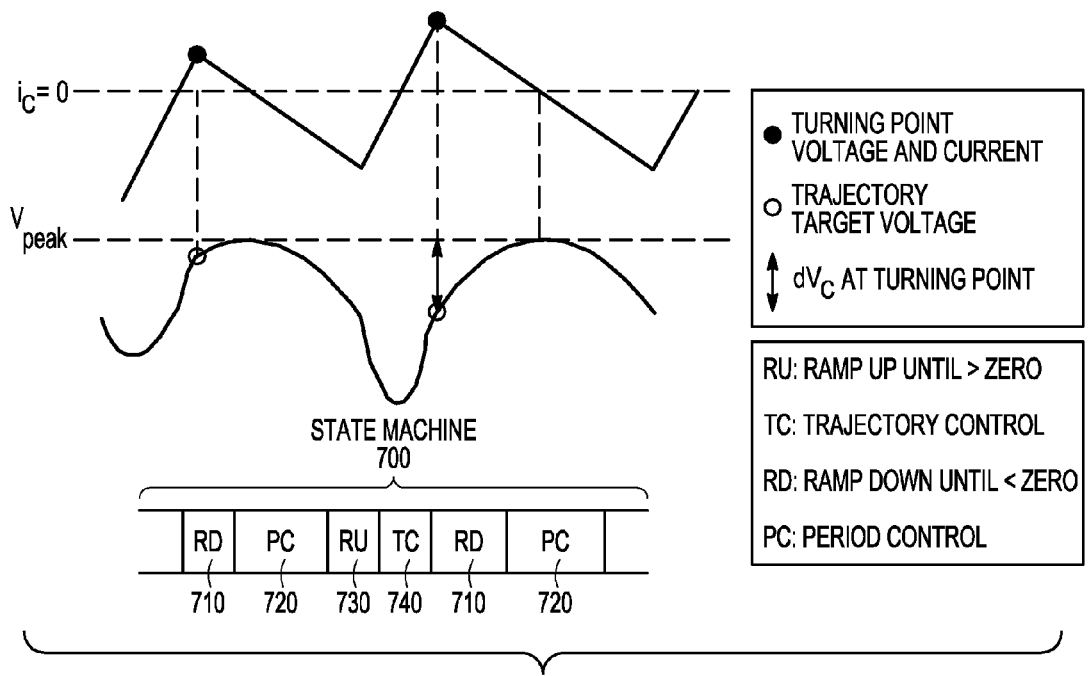
FIG. 7 is a graphical representation of a fixed-frequency control method according to one or more examples of the present specification.

FIG. 7 is a graphical representation of a fixed-frequency control method according to one or more examples of the present specification. In practice, single-cycle recovery with a truly fixed frequency architecture is mathematically impossible; recovery from any perturbation is an iterative process, taking place over several cycles to iterate towards aligning both the current and voltage waveforms with the fixed phase of the period, so that the turn-around point coincides with the correct duty cycle ratio for $v_{in}$ and $v_{out}$. In FIG. 7, state machine 700 is a modified version of state machine 600. In this case, state 710 represents "ramp down until $i_C<0$." State 720 represents "Period control." State 730 represents "Ramp up until $i_C>0$." State 740 represents "Trajectory control." Period control allows the user to determine how long the ramp down lasts for. In this way, peak voltage and switching frequency are both controlled at the expense of valley or ripple voltage control.

An alternative trajectory control method is fixed-frequency with dual-edge modulation control according to one or more examples of the present specification. The modified fixed-frequency control method allows the leading edge pulse to be pulled in by up to 50% of the down slope when required. In some embodiments, this also allows for "dead-beat" trajectory control, which is not possible with certain pure fixed-frequency approaches. Fixed-frequency control is achieved by extending the ramp-down period $T_{off}$ as a function of $v_{in}$ 102, $v_{out}$ 192, and a desired period T.

Here again, capacitor current zero-crossing provides a useful reference point for fixing the period T. In the steady-state, exactly half of the ramp-down time occurs after $i_C$ crosses zero. The duty cycle is known and so the on-time is known. Therefore, trajectory controller 600 can calculate exactly what half of the ramp-down time should be, and can start a timer once $i_C$ crosses zero. On the next cycle, the period, voltage, and current alignment will be perfect. The ramp-up will then be controlled entirely from the deficit, surplus, and turning-point equation of Equation 1 implementing peak voltage control.

After the ramp-down current in the capacitor crosses zero, the remaining half of the ramp-down time needs to be controlled by a timer that will set up the next period for fixed frequency. The equation for the half ramp-down time is as follows:

Half Rampdown Time Equation    Equation 7

$$\frac{T_{off}}{2} = T \cdot \frac{v_{DD} - v_{out}}{2v_{DD}}$$

Equation 7 can be easily implemented by currents proportional to voltages fed into a trimmed capacitor.

End of ramp up Equation    Equation 8

$$v_{peak} - v_C < \frac{i_C^2}{2v_{out}}\left(\frac{L}{C}\right)$$

Note that the term $i_C^2$ in the trajectory control equation has two roots, one negative and one positive. The negative current squared is indistinguishable from the positive current squared. This can cause a significant control problem. However, it is easily solved by waiting for zero crossing and only then measuring $i_C^2$. This is done in the state machine 600 of FIG. 6. This ensures the correct sign of $i_C$ and no false triggering. An alternative and equally valid solution would be to multiply an unsigned (absolute value) version of Ic with a signed version.

It should be noted that in practice, inductor 150 will not have a constant inductance L under load current $i_{load}$, and that capacitor 160's capacitance may also vary with voltage, and that either may have a non-zero (and thus non-ideal) output impedance. Because trajectory control according to certain embodiments of the present specification relies on the values of L and C to make calculations, it will be recognized that additional compensation for handling real-world, non-ideal parameters may be required. This may take the form, for example, of compensating for series resistance effects in the inductor and capacitor. Zero current in the capacitor, for example, removes effects of capacitor series resistance.

The nature of the trajectory control method disclosed herein lends itself to a simple automatically adjusting compensation, or rather self-optimization of the trajectory control gain. As can be seen in Equation 1, only the ratio of L/C needs to be known, so that a single variable, namely $i_C$, may be adjusted to fine-tune response.

Figure 8:
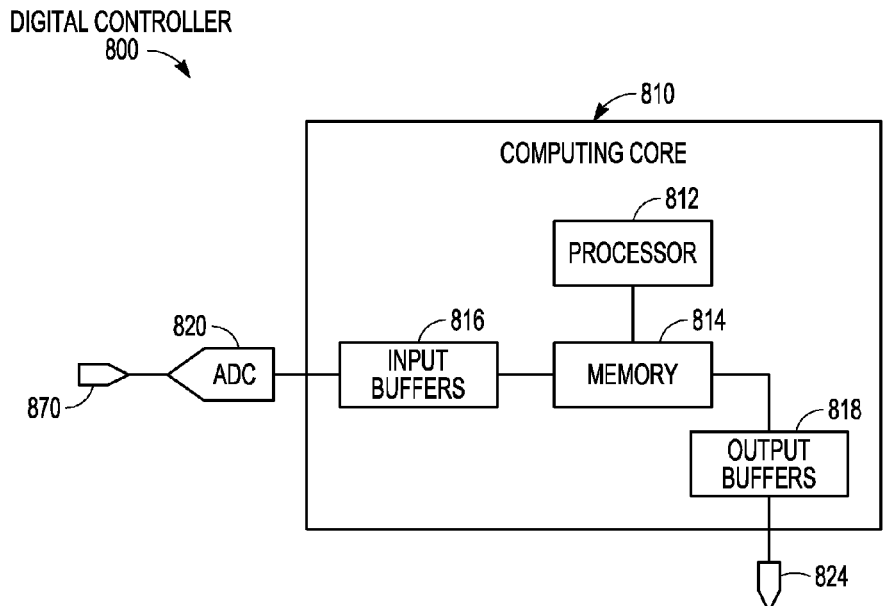
FIG. 8 is a block diagram of a digital controller according to one or more examples of the present specification.

FIG. 8 is a block diagram of digital controller 800 according to one or more examples of the present specification. In one embodiment, digital controller 800 provides, assists, or supplements auto-tuning controller 110 of FIG. 1.

In this example, one or more analog input signals 870, such as $i_C$, $V_L$, $dv_C$, or similar, are provided. ADC 820 receives analog inputs 870 and converts them to digital. ADC 820 provides the digital signals to a computing core 810. Computing core 810 may include, for example a processor 812, memory 814, and input buffers 816, and output buffers 818. In an example, processor 812 may receive a digital $dv_C$ via input buffers 816, and responsive to a programmed control law, compute a digital clock signal for regulating oscillator 130 of FIG. 1. Processor 812 may then drive this clock signal on an output buffer 818, where it is provided to oscillator 130. Software, firmware, or microcode instructions to effect these functions may be stored in memory 814.

It should be noted that in the foregoing description, processor 812 is disclosed by way of example only. As used throughout this specification, a "processor" includes any combination of hardware, software, or firmware providing programmable logic, including by way of non-limiting example a microprocessor, digital signal processor, field-programmable gate array, programmable logic array, application-specific integrated circuit, or virtual machine processor.

Figure 9:
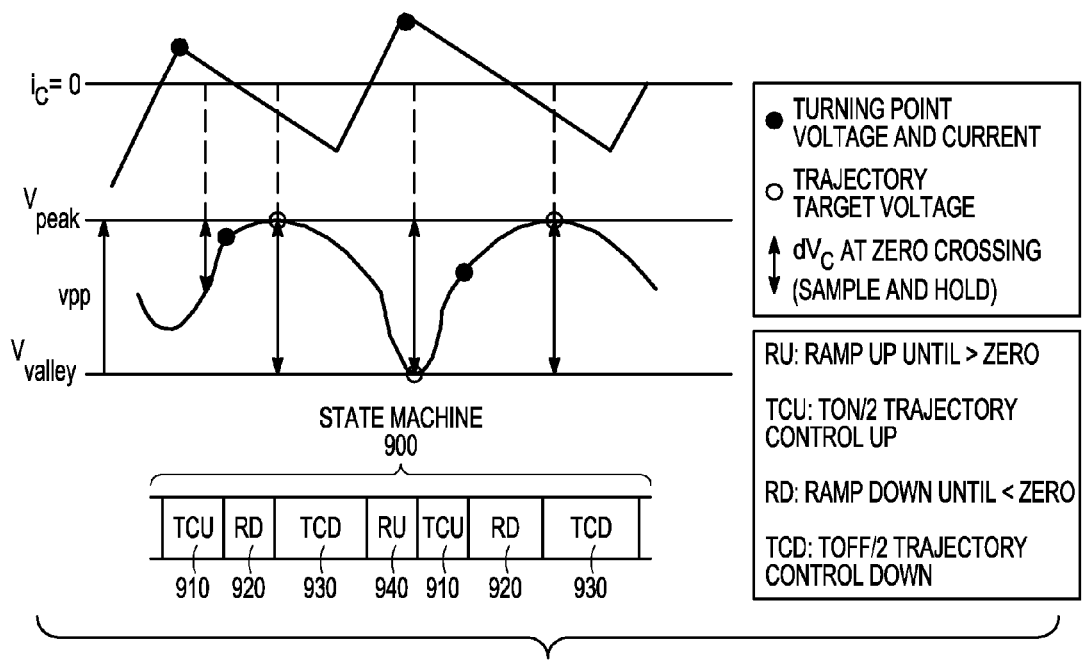
FIG. 9 is a graphical representation of a control law that may be implemented on a digital controller according to one or more examples of the present specification

FIG. 9 is a graphical representation of a control law that may be implemented on a digital controller, such as digital controller 800 of FIG. 8, in one or more examples of the present specification. In this embodiment, a control law is provided that accounts for certain parasitics in state machine 900, namely capacitor parasitic series resistance. By measuring the capacitor voltage only at the zero crossing current, series resistance effects can be eliminated, as there is zero voltage drop across a resistor with zero current. Rather than continuously measure voltage and current, a timed pulse duration can be computed for the Ton time after zero crossing, based on inductor drive voltages and the estimated LC combination. Equations for these time periods have been solved for and are shown in Equations 9, 10 and 11.

In an example, TCU state 910 is governed by Equation 10. RD state 920 is a ramp down until $i_C$ crosses zero. TCD state 930 is governed by Equation 11. RU state 940 is a ramp up until $i_C$ crosses zero.

Peak-to-Peak Ripple Voltage     Equation 9 as a Function of $T_p$ Time Period $$v_{PP} = \frac{T_p^2}{8LC} \cdot \left(vC - \frac{vC^2}{v_{DD}}\right)$$

Equation 9 shows that the frequency, or time-period, of the switching regulator can be precisely controlled by computing the ripple voltage required On-Time Pulse Duration After Zero Crossing     Equation 10

$$\frac{T_{on}}{2} = \sqrt{2LC \cdot \frac{v_{ref} + \frac{v_{pp}}{2} - v_{C_{uzc}}}{\frac{vL^2}{vC} + vL}}$$

Equation 10 shows trajectory control for exactly how long the on-pulse should last after positive-zero crossing current in the output capacitor.

Off-Time Pulse Duration After Zero Crossing     Equation 11

$$\frac{T_{off}}{2} = \sqrt{2LC \cdot \frac{\left(v_{ref} - \frac{v_{pp}}{2} - v_{C_{dzc}}\right)}{\frac{vC^2}{vL} + vC}}$$

Equation 11 shows trajectory control for exactly how long the off-pulse should last after negative-zero crossing current in the output capacitor. In the foregoing equations, $v_{pp}$ represents the peak-to-valley ripple voltage. $T_p$ represents the desired switching period. $v_{C_{uzc}}$ represents the capacitor voltage at the capacitor current zero crossing during ramp-up. $v_{C_{dzc}}$ represents the capacitor voltage at the capacitor current zero crossing during ramp-down. Thus, in an embodiment, the inputs to a system realizing the foregoing equations include $T_p$, L, and C. Variables include $v_C$ and $V_{DD}$.

Note that in certain embodiments, realizing the foregoing equations in analog circuitry could be prohibitively complex and error prone, particularly in an integrated-circuit controller, where silicon surface area is at a premium. However, with a digital controller, such as digital controller 800 of FIG. 8, the foregoing equations can be more accurately realized and adapted in software.

Advantageously, in certain embodiments of the foregoing control laws, the capacitor voltage $v_C$ is sampled and held at the zero-crossing, for a target value at the next zero crossing, where $v_C$ will again be sampled and held for the next zero crossing, and so on. Thus, data for the actual voltage versus the computed voltage is known, and can be used to correct auto-tuning controller 110. For example, ripple voltage can be directly measured by the difference in two consecutive zero-crossing voltages, eliminating any offset errors that may be caused by $T_{on}$ and $T_{off}$ propagation delay mismatches.

One difficulty that may be encountered in certain embodiments of the present specification includes measuring $i_C$, $V_L$, and $\Delta v_C$. Specifically, if the control law is implemented digitally, a processor cannot process the analog signals of $\Delta v_C$ and $i_C$ in real-time or near-real-time like an analog signal processing block. Instead, sample-hold and ADC circuits are used to compute time durations for $T_{on}$ and $T_{off}$ based upon zero-crossings of the capacitor current. The Trajectory control equation may also become more complex, as the "turning point" equation is a model-based equation based on $i_C$ zero crossing. Digital methods also cannot react as fast to instantaneous load changes due to the sample-and-hold based approach. A ripple voltage equation may be used to maintain a constant frequency.

Advantageously, the methods discussed herein provide auto-tuning of a switching regulator such as switching regulator 100 of FIG. 1, even in the presence of varying or non-ideal L and C parameters. Certain known auto-tuning switching regulators realize such control only via digital systems, such as those implemented in a dedicated digital signal processor (DSP) or other similar processor. While a DSP provides much greater flexibility in programming a control law, in most cases a DSP cannot match the high speed of analog circuitry. Thus, those having skill in the art will recognize the need to make appropriate design decisions to implement the best solution in a given situation. In one example, a hybrid analog/digital point-of-load controller, such as the one described in co-pending U.S. application Ser. No. 14/162,297 ("Hybrid Analog/Digital Point of Load Controller," filed 23 Jan. 2014), which is incorporated herein by reference, may be used. In that case, an analog controller may be used to respond to large current transients, while a digital control law may be used to respond to smaller current transients and to control steady-state operation.

In certain contexts, the switching regulator described herein may be used in numerous applications including, for example, medical systems, scientific instrumentation, wireless and wired communications, radar, industrial process control, audio and video equipment, current sensing, instrumentation (which can be highly precise), and other digital-processing-based systems. Moreover, certain embodiments discussed above can be provisioned in medical imaging, patient monitoring, medical instrumentation, and home healthcare products. Other applications can involve automotive technologies for safety systems (e.g., stability control systems, driver assistance systems, braking systems, infotainment and interior applications of any kind). Furthermore, powertrain systems (for example, in hybrid and electric vehicles) can use high-precision data conversion products in battery monitoring, control systems, reporting controls, maintenance activities, etc., which may require highly-stable and predictable power supplies. In yet other example scenarios, the teachings of the present disclosure can be applicable in the industrial markets that include process control systems that help drive productivity, energy efficiency, and reliability. In consumer applications, the teachings of the controller discussed above can be used for image processing, auto focus, and image stabilization (e.g., for digital still cameras, camcorders, etc.). Other consumer applications can include audio and video processors for home theater systems, DVD recorders, and high-definition televisions. Yet other consumer applications can involve advanced touch screen controllers (e.g., for any type of portable media device). Hence, such technologies could readily be part of smartphones, tablets, security systems, PCs, gaming technologies, virtual reality, simulation training, etc.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

In example implementations, at least some portions of the processing activities outlined herein may also be implemented in software. In some embodiments, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described herein should be construed as being encompassed within the broad term 'microprocessor' or 'processor.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In the discussions of the embodiments above, the capacitors, buffers, graphics elements, interconnect boards, clocks, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, non-transitory software, etc. offer an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio-video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the specification, to limit this disclosure in any way that is not otherwise reflected in the appended claims.

What is claimed is:

1. A method for controlling a switching regulator circuit, the circuit including an inductor having inductance, L, coupled to a capacitor having capacitance, C, the method comprising:
   operating the switching regulator circuit by implementing a single control scheme for both small-signal current changes and large current transients, the control scheme comprising:
      monitoring a voltage across the capacitor to estimate a current through the capacitor, including establishing a first derivative of a signal representative of the voltage across the capacitor;
      establishing an inductor current turning point value in response to the estimated current through the capacitor; and
      controlling a conduction state of a switch in accordance with the established inductor current turning point value, the switch configured to apply an input voltage to the inductor; and
   tuning the switching regulator circuit, including during non-transient conditions, including constraining the voltage across the capacitor to a specified error value, the specified error value established at least in part using a ratio L/C.

2. The method of claim 1, wherein the specified error value is represented by $$\Delta v_C = \frac{i_C^2}{2v_L} \cdot \frac{L}{C}.$$

3. The method of claim 1, wherein the control scheme comprises a fixed-frequency control scheme including using a specified switching period, T, including controlling a ramp-down period, $T_{off}$, for the capacitor current to provide the specified period, T.

4. The method of claim 1, wherein tuning the switching regulator circuit comprises automatically tuning based on a peak voltage error.

5. The method of claim 1, wherein tuning the switching regulator circuit comprises automatically tuning based on a valley voltage error.

6. The method of claim 1, wherein tuning the switching regulator circuit comprises automatically tuning based on a peak minus valley ripple voltage magnitude.

7. A switching regulator circuit, comprising:
   an inductor configured to receive an input voltage;
   a capacitor electrically coupled to the inductor;
   a switch configured to apply the input voltage to the inductor;
   a controller coupled to the switch and configured to control a conduction state of the switch according to a control scheme, the control scheme comprising:
      monitoring a voltage across the capacitor to estimate a current through the capacitor, including establishing a first derivative of a signal representative of the voltage across the capacitor;
      establishing an inductor current turning point value in response to the estimated current through the capacitor; and
      controlling a conduction state of the switch in accordance with the established inductor current turning point value;
      wherein establishing the inductor turning point value includes constraining the voltage across the capacitor to a specified error value, the specified error value established at least in part using a representation of a value of an inductance, L, of the inductor relative to a value, C, of the capacitor.

8. The switching regulator circuit of claim 7, wherein the specified error value is represented by $$\Delta v_C = \frac{i_C^2}{2v_L} \cdot \frac{L}{C}.$$

9. The switching regulator circuit of claim 7, wherein the controller comprises:
   a comparator circuit; and
   a zero-crossing detector circuit;
   a latch circuit coupled to the output of the comparator circuit;
   an integrator circuit;
   wherein the comparator circuit is configured to compare the voltage across the capacitor to a reference voltage;

wherein the zero-crossing detector is configured to trigger the latch circuit in response to detecting a zero-crossing of the capacitor voltage; and wherein the integrator circuit is configured to sum an output of the latch circuit representative of the comparator output and to provide an output having a value proportional to a ratio of value of the inductance, L, relative to the value, C, of the capacitor.

10. The switching regulator circuit of claim 7, wherein the controller is configured to operate according to a fixed-frequency control scheme.

11. The switching regulator circuit of claim 10, wherein the controller is configured to operate according to the fixed-frequency control scheme including using a specified switching period, T, including controlling a ramp-down period, $T_{off}$, for the capacitor current to provide the specified period, T.

12. The switching regulator circuit of claim 7, wherein the controller is configured to operate according to a hysteretic control scheme.

13. The switching regulator circuit of claim 12, wherein the specified error value is established using a specified peak capacitor voltage.

14. The switching regulator circuit of claim 12, wherein the specified error value is established using a specified valley capacitor voltage.

15. The switching regulator circuit of claim 7, wherein the controller is configured to implement a single control law for both small-signal load current changes and large load current transients.

16. A method for operating a switching regulator circuit, comprising:
applying an input voltage to an inductor using a switch coupled to a controller circuit;
monitoring a voltage across a capacitor to estimate a current through the capacitor, including establishing a first derivative of a signal representative of the voltage across the capacitor, the capacitor electrically coupled to the inductor;
establishing an inductor current turning point value in response to the estimated current through the capacitor; and
controlling a conduction state of the switch in accordance with the established inductor current turning point value;
wherein establishing the inductor turning point value includes constraining the voltage across the capacitor to a specified error value, the specified error value established at least in part using a representation of a value of an inductance, L, of the inductor relative to a value, C, of the capacitor.

17. The method of claim 16, wherein the specified error value is represented by $$\Delta v_C = \frac{i_C^2}{2v_L} \cdot \frac{L}{C}.$$

18. The method of claim 16, wherein the controller circuit operates according to the fixed-frequency control scheme including using a specified switching period, T, including controlling a ramp-down period, $T_{off}$, for the capacitor current to provide the specified period, T.

19. The method of claim 16, wherein the specified error value is established using a specified peak capacitor voltage.

20. The method of claim 16, wherein the specified error value is established using a specified valley capacitor voltage.

* * * * *